US 6,676,200 B1

(12) United States Patent
Peng

(10) Patent No.: US 6,676,200 B1
(45) Date of Patent: Jan. 13, 2004

(54) AUTOMOTIVE UNDERBODY WITH LATERAL ENERGY ABSORPTION AUGMENTATION

(75) Inventor: Zheng James Peng, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,017

(22) Filed: Dec. 11, 2002

(51) Int. Cl.[7] .............................................. B62D 25/20
(52) U.S. Cl. .................. 296/204; 296/187.08; 296/209
(58) Field of Search ................................. 296/204, 209, 296/30, 203.03, 205, 188, 189, 29, 203.01, 208, 187.01, 187.03, 187.08, 193.05, 193.07

(56) References Cited

U.S. PATENT DOCUMENTS

| 3,455,595 A | * | 7/1969 | Wessells III, et al. ...... 296/208 |
| 3,791,472 A | * | 2/1974 | Tatsumi ...................... 180/312 |
| 4,898,419 A | * | 2/1990 | Kenmochi et al. ........... 296/204 |
| 5,613,727 A | * | 3/1997 | Yamazaki .................... 296/188 |
| 5,700,049 A | * | 12/1997 | Shibata ......................... 29/188 |
| 5,924,765 A | | 7/1999 | Lee |
| 5,944,377 A | * | 8/1999 | Vlahovic ...................... 296/204 |
| 6,003,935 A | * | 12/1999 | Kalazny ....................... 296/204 |
| 6,062,633 A | * | 5/2000 | Serizawa ....................... 296/199 |
| 6,073,992 A | | 6/2000 | Yamauchi et al. |
| 6,129,412 A | * | 10/2000 | Tanuma ........................ 296/204 |
| 6,139,094 A | * | 10/2000 | Teply et al. ............ 296/203.03 |
| 6,299,240 B1 | * | 10/2001 | Schroeder et al. ...... 296/203.01 |
| 6,357,819 B1 | | 3/2002 | Yoshino |
| 6,409,257 B1 | | 6/2002 | Takashina et al. |
| 6,431,641 B2 | * | 8/2002 | Miyasaka ............... 296/203.03 |
| 6,540,286 B2 | * | 4/2003 | Takemoto et al. ........... 296/204 |

FOREIGN PATENT DOCUMENTS

JP          6-7621          1/1994

* cited by examiner

Primary Examiner—Joseph D. Pape
Assistant Examiner—Greg Blankenship
(74) Attorney, Agent, or Firm—Gigette M. Rejin

(57) ABSTRACT

An automotive body includes inner and outer rocker panels, a floor pan joined to the inner rocker panel, and cross members extending laterally across a portion of the body. The cross members have energy-absorbing cross member extensions interposed between outboard ends of the cross members and the inner rocker panel, so as to provide a structure for absorbing impact loads imposed laterally upon the vehicle body.

18 Claims, 3 Drawing Sheets

AUTOMOTIVE UNDERBODY WITH LATERAL ENERGY ABSORPTION AUGMENTATION

BACKGROUND OF INVENTION

1. Field of the Invention

The present invention relates to an automotive vehicle body having enhanced energy absorbing cross member augmentation.

2. Disclosure Information

Destructive testing of automotive vehicles typically includes the imposition of dynamic loading to the vehicle bodysides, typically in the form of a pendulum strike on the bodyside, or by crash testing. Such testing, in either form, imposes severe loading on the structural members of the body. The inventor of the present structural system has determined that the ability of the body to manage such laterally directed loads will be enhanced with the addition of an energy management device described herein. The present device allows the vehicle's body cross members to react in a more controlled manner against laterally imposed loads, and at an earlier time during a crash sequence, because the deformation of the body will result in column loading of the underbody cross members at an earlier time than was previously the case. Although automotive bodies used in conventional body-on-frame construction have typically used cross members for decades, such cross members have not been involved in the management of crash related energy in the manner of the augmented cross members described herein. In essence, with a more typical construction, the space between the inner rocker panel and the end of the underbody cross members must first be closed by plastic deformation of the sheet metal bridging between these two structures. This sheet metal is usually flat and comprises a portion of the floorpan. The present invention provides much greater energy absorption during this stage of the bodyside deformation by providing the capability for column deformation of the present inventive structures, as well as the cross members, rather than mere bending of flat sections of sheet metal.

SUMMARY OF INVENTION

According to the present invention, an automotive body includes an outer rocker panel, an inner rocker panel joined to the outer rocker panel, a floor pan joined to the inner rocker panel, and at least one cross member extending laterally across a portion of the body, with the cross member being joined to the floor pan. The present inventive system also includes a cross member extension interposed between an outboard end of the cross member and the inner rocker panel. The cross member extension preferably has a first end welded to the inner rocker panel and a second end welded to either the cross member itself or to a vertically extending portion of a lower floor pan. In the latter case, the cross member will itself be welded to the vertically extending portion of the lower floor pan.

An automotive body according to present invention may preferably comprise either a welded steel structure or a plastic composite structure, or combinations thereof. For example, a cross member extension according to the present invention may comprise either high strength plastic or foam, or other plastic or fiber reinforced plastic composites, or carbon fiber, or stamped steel or aluminum, or other metallic and non-metallic materials known to those skilled in the art and suggested by this disclosure.

A cross member extension according to the present invention may fill the entire gap extending between an lower floor pan and an inner rocker panel; alternatively, the cross member extension may have a relieved portion permitting the passage of conductors through the vehicle body in a direction generally parallel to the inner rocker panel. The cross member extension may comprise either a downward opening channel, or a complete box section. Further, the cross member may comprise an upward opening channel having flanges joined to the floor pan by bonding, welding or other methods known to those skilled in the arts and suggested by this disclosure.

An automotive body according to the present invention preferably comprises a plurality of cross members with each having cross member extensions aligned with the ends of the cross members at each end of the cross members. In other words, it is contemplated that two cross member extensions will be associated with a plurality of cross members in an automotive body constructed according to the present invention.

According to another aspect of the present invention, a method for reacting to an impact load imposed laterally on a passenger door of an automotive body includes the steps of reacting to the load initially with plastic deformation of the door, followed by reacting secondarily with plastic deformation of a rocker panel structure abutting the door, in response to loading imposed upon the rocker panel structure by the door, and finally, reacting to the load with column compression and buckling of the cross member and a channel-shaped cross member extension in response to loading imposed upon the cross member extension by the rocker panel structure.

It is an advantage of the present invention that the present cross member extension structure allows an automotive body to react to higher loads with more controlled plastic deformation of the body structure.

Other advantages, as well as objects and features of the present invention, will become apparent to the reader of this specification.

DETAILED DESCRIPTION

Figure 1:
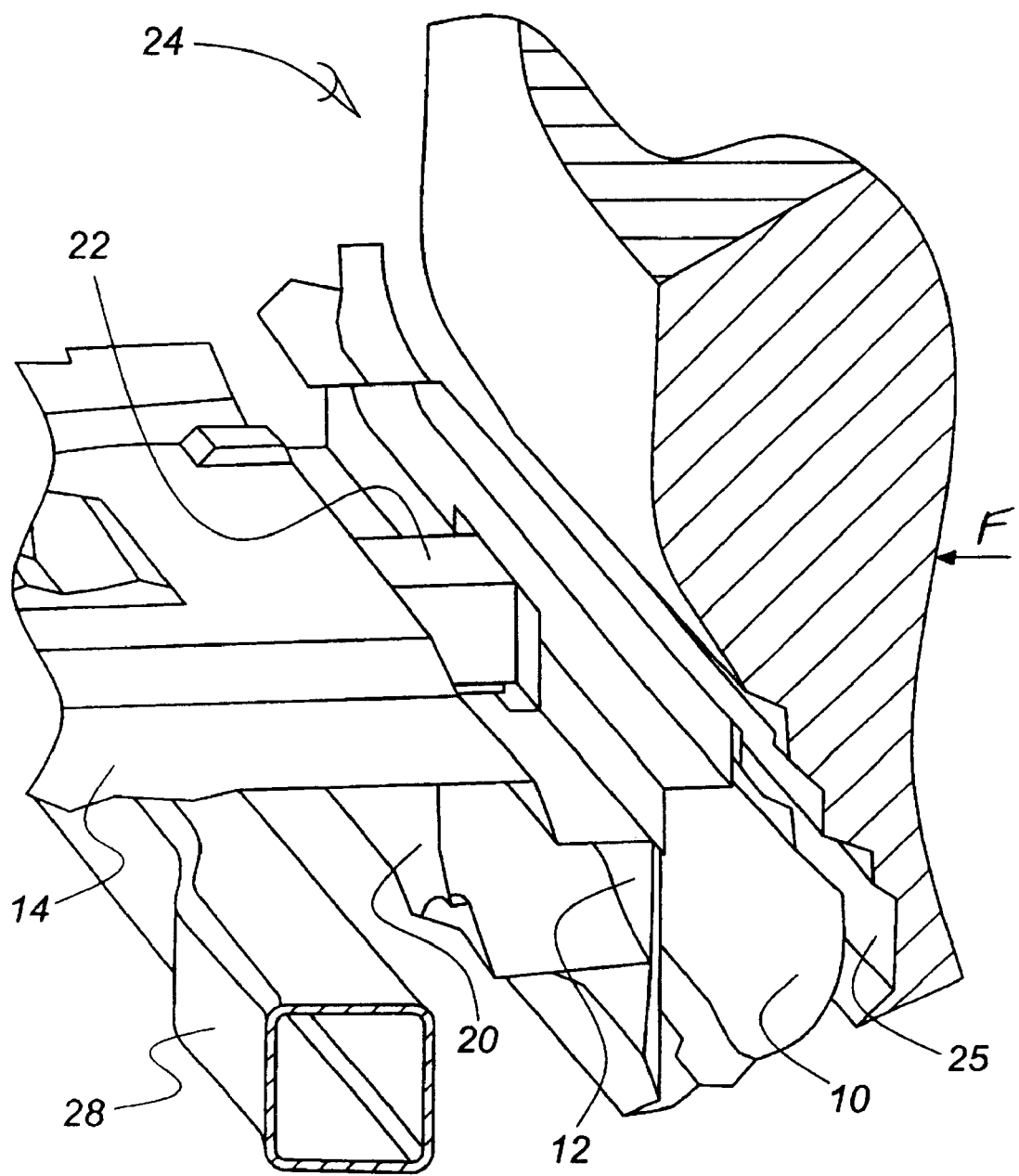
FIG. 1 is a perspective rendering of a vehicle body according to the present invention.

As shown in FIG. 1, the inner panel 25 of door 24 abuts outer rocker panel 10 such that a laterally directed load, F, imposed upon door 24 will be reacted initially by door 24 and then by outer rocker panel 10 through the abutting contact of door inner panel 25 and outer rocker panel 10. The load will then be transmitted through inner rocker panel 12 floor pan 14, and more particularly, to cross member extension 22. As shown in FIG. 1, floor pan 14 extends over a portion of cross member extension 22. Floor pan 14 is itself superimposed upon frame rail 28. Floor pan 14 will not normally be attached directly to frame rail 28. Although the construction shown herein is that of a separate frame and body vehicle, those skilled in the art will appreciate a view of this disclosure that the present inventive concept could be employed with a body having unitized construction.

Figure 2:
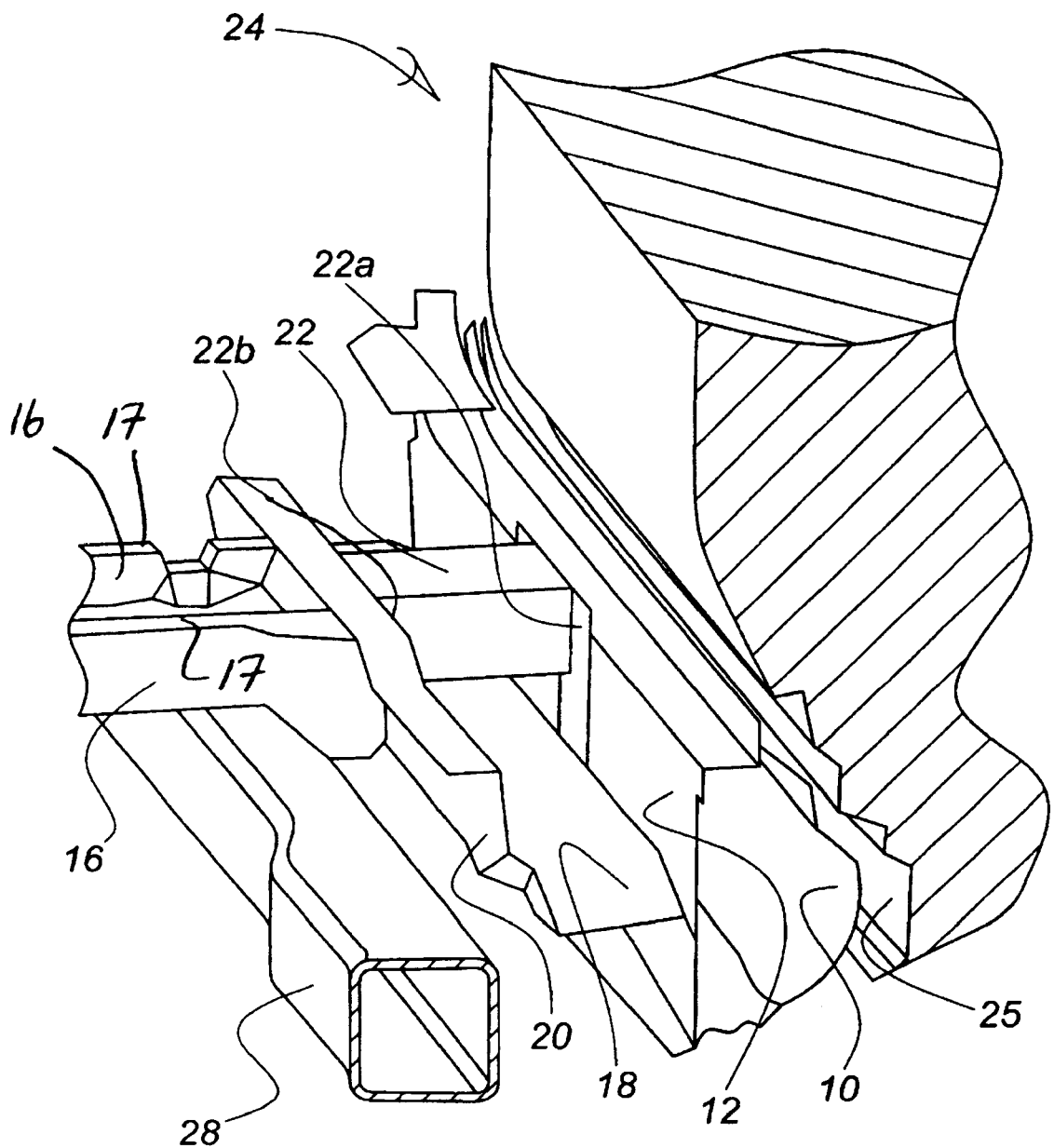
FIG. 2 is a perspective rendering similar to FIG. 1 but indicating additional detail revealed by removal of the floor pan of the vehicle.

FIG. 2 illustrates a body according to the present invention in which floor pan 14 has been removed for the convenience of showing various details of construction. Thus, cross member 16 is shown as having an upward opening channel with flanges 17 for the purpose of joining cross member 16 with floor pan 14. Those skilled in the art will appreciate in view of this disclosure that component parts such as floor-pan 14, cross member 16, inner and outer rocker panels 10 and 12 respectively, as well as lower floor pan 18 and cross member extension 22 may be formed of metallic and non-metallic materials joined by such processes as riveting, adhesive bonding, TIG welding, friction welding, fusion welding, spot welding, beam welding, solvent welding and other types of joining processes known to those skilled in the art and suggested by this disclosure. In any event, cross member 16 is joined at an outboard end to generally vertically extending portion 20 of lower floor pan 18. Similarly, cross member extension 22 has a first end 22a welded to inner rocker panel 12, and a second end 22b welded to vertically extending portion 20 of lower floor pan 18. It should be noted here that cross member 16 has an end welded to lower floor pan 18 in a location which is proximate to the location at which cross member extension 22 is joined by welding to lower floor pan 18. In this manner, the central axis of cross member 16 is generally aligned with cross member extension 22.

If cross member extension 22 is formed of molded composite or plastic foam or other nonmetallic material, joining of inner rocker panel 12 and cross member extension 22 may be accomplished by processes other than welding processes normally reserved for metallic components.

Laterally imposed loads which are reacted first by door 24 through plastic deformation of door 24 are then reacted by outer rocker panel 10, then by inner rocker panel 12, and then by column loading and buckling deformation of cross member extension 22 and cross member 16. Deformation of floor pan 14 will also occur. Cross member extension 22 allows the lateral load to be imposed upon cross member 16 at an earlier time during the laterally directed energy management and deformation cycle because cross member 16 will undergo significant column loading once outer rocker panel 10 has deformed to the extent that inner rocker panel 12 has been subjected to significant loading.

It is contemplated that a vehicle body according to the present invention would preferably employ a plurality of cross members 16, with the cross members being spaced along the central portion of the vehicle body, and with cross member extensions 22 being mounted at both ends of each cross member 16.

Figure 3:
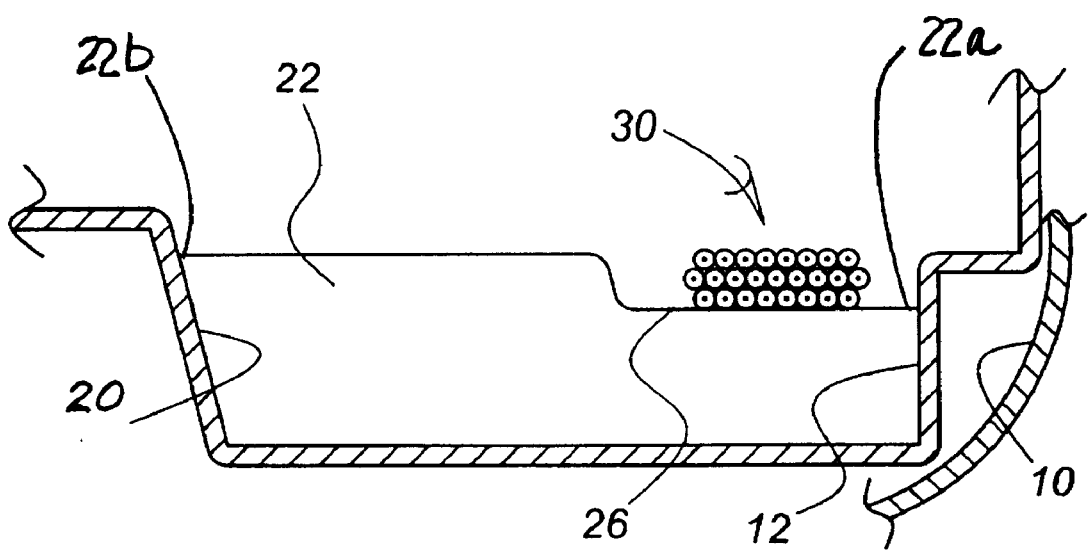
FIG. 3 is a rear elevation of a cross member extension according to the present invention.

FIG. 3 illustrates an adaptation of cross member extension 22 to accommodate various conductors such as electrical and fluid lines used with a vehicle. Such conductors 30 are shown as occupying a space defined by relieved section 26 incorporated in cross member extension 22.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. An automotive body comprising: an outer rocker panel; an inner rocker panel joined to said outer rocker panel; a floor pan joined to said inner rocker panel; at least one cross member extending laterally across a portion of said automotive body, with said at least one cross member being joined to said floor pan; and a cross member extension interposed between an outboard end of said cross member and said inner rocker panel, wherein said cross member extension has a first end welded to said inner rocker panel and a second end welded to a vertically extending portion of a lower floor pan, with said at least one cross member having an end welded to said lower floor pan proximate the location at which said cross member extension is welded to said lower floor pan.

2. An automotive body according to claim 1, wherein said automotive body comprises welded steel.

3. An automotive body according to claim 1, wherein said automotive body comprises a plastic composite.

4. An automotive body according to claim 1, wherein said inner and outer rocker panels, said floor pan, said cross member, and said cross member extension all comprise formed metal.

5. An automotive body according to claim 1, wherein said inner and outer rocker panels, said floor pan, and said cross member comprise formed metal and said cross member extension comprises molded plastic.

6. An automotive body according to claim 1, wherein said inner and outer rocker panels, said floor pan, and said cross member comprise formed metal and said cross member extension comprises plastic foam.

7. An automotive body according to claim 1, wherein said cross member extension has a relieved section permitting the passage of conductors through the body in a direction generally parallel to the inner rocker panel.

8. An automotive body according to claim 1, wherein said inner and outer rocker panels, said floor pan, said cross member, and said cross member extension each comprise stamped steel.

9. An automotive body according to claim 1, wherein said inner and outer rocker panels, said floor pan, said cross member, and said cross member extension each comprise stamped aluminum.

10. An automotive body according to claim 1, further comprising a door extending over at least a portion of said outer rocker panel.

11. An automotive body according to claim 1, wherein said floor pan has a channel section immediately inboard of said inner rocker panel, with a portion of said channel section being welded to said inner rocker panel.

12. An automotive body comprising:

an outer rocker panel;

an inner rocker panel joined to said outer rocker panel to form a generally tubular structure;

a floor pan joined to said inner rocker panel;

at least one cross member extending laterally across a portion of said automotive body, with said at least one cross member being joined to said floor pan, and with said cross member having a central axis and two outboard ends;

a lower floor pan extending between one of said outboard ends of said cross member said inner rocker panel, with said lower floor pan being joined to said outboard end of said cross member and to said inner rocker panel; and an energy-absorbing cross member extension interposed between said lower floor pan and said inner rocker panel, with said cross member extension having a first end joined to an outboard surface of said lower floor pan at a position which is aligned with the central axis of said at least one cross member, and a second end which is joined to said inner rocker panel.

13. An automotive body according to claim 12, wherein said cross member extension traverses a channel formed by said floor pan and said inner rocker panel.

14. An automotive body according to claim 12, wherein said cross member extension comprises a downward-opening channel.

15. An automotive body according to claim 12, wherein said cross member comprises a channel having flanges joined to said floorpan.

16. An automotive body according to claim 12, wherein said cross member comprises an upward-opening channel having top flanges joined to said floorpan.

17. An automotive body according to claim 12, comprising a plurality of said cross members and a plurality of said cross member extensions, with one of said cross member extensions being aligned with each end of said cross members.

18. A method for augmenting the capability of an automotive body to react to an impact load imposed laterally on a passenger door of the automotive body, comprising the steps of:

reacting to said load initially with plastic deformation of said door;

reacting to said load secondarily with plastic deformation of a rocker panel structure abutting said door, in response to loading imposed upon the rocker panel structure by said door; and reacting to said load with column compression and buckling of a cross member and a cross member extension mounted between an outboard end of the cross member and the rocker panel structure, in response to loading imposed upon the cross member extension by the rocker panel structure.

* * * * *